United States Patent
Aratani et al.

(10) Patent No.: US 6,788,635 B1
(45) Date of Patent: Sep. 7, 2004

(54) OPTICAL RECORDING MEDIUM, OPTICAL RECORDING METHOD, OPTICAL REPRODUCING METHOD, OPTICAL RECORDING DEVICE, OPTICAL REPRODUCING DEVICE, AND OPTICAL RECORDING/REPRODUCING DEVICE

(75) Inventors: Katsuhisa Aratani, Chiba (JP); Seiji Kobayashi, Kanagawa (JP); Masanobu Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 516 days.

(21) Appl. No.: 09/787,731
(22) PCT Filed: Jul. 19, 2000
(86) PCT No.: PCT/JP00/04860
§ 371 (c)(1),
(2), (4) Date: Aug. 23, 2001
(87) PCT Pub. No.: WO01/08145
PCT Pub. Date: Feb. 1, 2001

(30) Foreign Application Priority Data

Jul. 22, 1999 (JP) .......................................... 11-208179

(51) Int. Cl.$^7$ ................................................ G11B 7/00
(52) U.S. Cl. ...................... 369/100; 369/284; 369/275.1
(58) Field of Search .............................. 369/100, 275.1, 369/275.3, 284, 94, 102, 275.2; 430/270.13

(56) References Cited

U.S. PATENT DOCUMENTS 4,961,077 A   10/1990  Wilson et al. .............. 369/273
5,617,408 A   4/1997   Nishizawa et al. ...... 369/275.4
5,862,121 A   1/1999   Suzuki ..................... 369/275.1

FOREIGN PATENT DOCUMENTS

| EP | 329122 | 8/1989 |
|----|--------|--------|
| JP | 4-28032 | 1/1992 |
| JP | 6-131700 | 1/1992 |
| JP | 9-306026 | 5/1994 |
| JP | 8-102133 | 4/1996 |
| JP | 8-124219 | 4/1997 |
| JP | 9-259470 | 9/1997 |
| JP | 2-56750 | 10/1997 |
| JP | 11-191218 | 7/1999 |

Primary Examiner—W. R. Young
Assistant Examiner—J. L. Ortiz Criado
(74) Attorney, Agent, or Firm—Sonnenschein, Nath & Rosenthal LLP

(57) ABSTRACT

An optical recording medium having an information layer with a reflective film on which an information recording portion is formed by physical change of shape at least in one direction of thickness and track width, the reflective film having such a structure that additional recording can be performed by thermal recording, and that the reflectance of the reflective film changes in the range of $0.5\% < (|R_0-R_1|/R_0) \times 100\% < 17\%$, where $R_0$ is reflectance of non-recording state and $R_1$ is reflectance of recording state for reproducing beam. Such optical recording medium can be manufactured at low cost with additional recording.

21 Claims, 5 Drawing Sheets

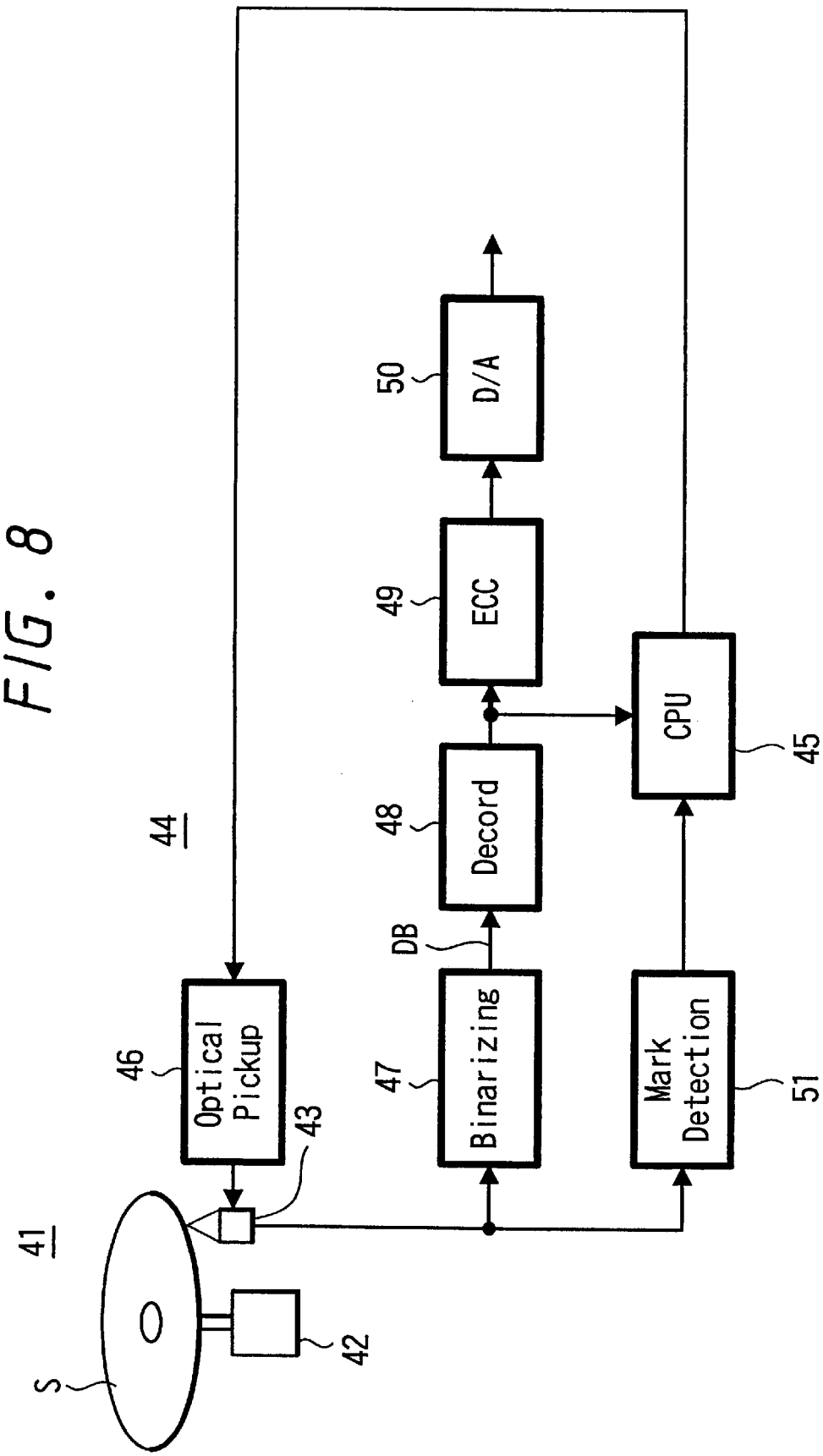

OPTICAL RECORDING MEDIUM, OPTICAL RECORDING METHOD, OPTICAL REPRODUCING METHOD, OPTICAL RECORDING DEVICE, OPTICAL REPRODUCING DEVICE, AND OPTICAL RECORDING/REPRODUCING DEVICE

TECHNICAL FIELD

The present invention relates to a optical recording medium, an optical recording method, an optical reproducing method, an optical recording device, an optical reproducing device, and an optical recording/reproducing device.

BACKGROUND ART

As a conventional optical recording medium, for example, a CD (Compact Disk) used for, e.g., an audio system, a game program, or the like, or a so-called ROM (Read Only Memory) type disk which is used in only reproduction in an optical disk such as a DVD (Digital Versatile Disk) for a video system or the like is known.

Information recording in such an optical recording medium is performed such that a recording portion, e.g., an uneven pits, a wobbling groove, or the like in which information is recorded as a change in physical shape in one of a direction of thickness or a direction of track width is formed, and an Al reflective film is coated to be able to read the information of the recording portion with a high optical S/N.

In the optical recording medium having the recording portion which is subjected to the change in physical shape, for example, the recording portion is formed synchronously with molding of a plastic substrate by, e.g., injection molding, or the recording portion is formed by a 2P method (Photopolymerization method) on, e.g., a plastic substrate. For this reason, the optical recording medium can be advantageously manufactured at low cost in mass production.

Therefore, it is a problem that copying of the optical recording medium of this type is performed without using a proper route, i.e., copying is performed without permission of a copyright holder. Since reading for the optical recording medium is performed without contact, a deterioration in characteristic rarely occurs even through the optical recording medium is repeatedly used. Therefore, the sale is performed without using a proper route such that a used optical recording medium is sold as a new optical recording medium. Similarly, the sale is performed without permission of a copyright holder, disadvantageously.

The optical recording medium of this type is desired such that the additional recording of a cipher, a mark, or the like serving as a means for judging whether the optical recording medium is obtained through a proper route on a maker side can be performed.

For example, in a game, it is desired by users that an optical recording medium has such a function that an end point of the game can be recognized when the game is temporarily ended. It is desired that simple recording such as recording of personal information of a user can be performed on a user side.

In addition, it is desired by makers and users that an optical recording disk has a function of correcting some data stored in the disk after the disk is manufactured or a function of partially adding new data. For example, in a satellite navigation system, when the additional functions are added, a simple change of a map and additional information are transmitted from a maker or are inputted by a user herself/himself as data, so that the change and the information can be recorded on a disk by the user.

A conventional recording medium in which conventional optical recording can be performed, e.g., a CD-R in which additional recording can be performed only once is manufactured such that a coloring material is coated on a plastic substrate having a guide groove by a spin coat method, and Au is sputtered on the plastic substrate.

A programmable photomagnetic recording medium is manufactured such that a transparent dielectric film, a vertical magnetized film consisting of TbFeCo serving as a recording material, a transparent dielectric film, and an Al reflective film are sequentially sputtered.

A rewritable phase change recording medium is formed by using a phase change material such as GeSbTe serving as a recording material in the configuration of the rewritable optical recording medium.

However, all the recording media described above are expensive. In the rewritable optical recording medium, the number of steps in manufacturing the rewritable optical recording medium is large because a large number of films must be formed as described above. When an additional recording layer is formed by using each of these materials as a recording material, the rewritable optical recording medium is more expensive than the ROM type optical recording medium such as a CD described above.

It is an object of the present invention to provide an optical recording medium, an optical recording method, an optical reproducing method, an optical recording device, an optical reproducing device, and an optical reproducing device which can be inexpensively manufactured by a configuration and a manufacturing method corresponding to a ROM type configuration described above and which make it possible to perform additional description of the cipher, the mark, and the like described above.

DISCLOSURE OF THE INVENTION

An optical recording medium having an information layer with a reflective film on which an information recording portion is formed by physical change of shape at least in one direction of depth and track width, wherein said reflective film having such an a structure that additional recording can be performed by thermal recording, and that the reflectance of said reflective film changes in the range of $0.5\% < (|R_0 - R_1|/R_0) \times 100\% < 17\%$, where $R_0$ is reflectance of non-recording state and $R_1$ is reflectance of recording state for reproducing beam.

The optical recording medium of claim 1, characterized in that if the additional recording region of said reflective film is at least partially overlapped with said information recording portion formed by physical change of shape, the reflectance of said reflective film changes in the range of $0.5\% < (|R_0 - R_1|/R_0) \times 100\% < 10\%$.

According to a method of optical recording of the present invention, the thermal recording for additional recording is performed on optical recording medium of the present invention as described above by irradiation of laser light which is modulated by additional recording information signal, to change or to increase or decrease the reflectance of reflective film due to the change of quality of the reflective film, e.g. the movement of atoms, the change of crystal structure or the like.

According to a method of optical reproducing of the present invention, on the optical recording medium of the present invention as described above on which additional recording has been performed by changing of the reflectance of reflective film, laser beam is irradiated to reproduce the additional recording by the micro change of return light due to the change of reflectance.

Further, an optical recording apparatus of the present invention has optical recording means for performing additional recording on the additional recording region of the reflective film of the optical recording medium of the present invention as described above. The optical recording means has laser irradiation means for irradiating laser beam which is modulated in response to the additional recording information on the optical recording medium and the additional recording can be performed by thermal recording which is due to the change of reflectance through the change of quality of the reflective film by irradiation of laser beam.

Furthermore, an optical reproducing apparatus is applied to reproduce additional recording which has been recorded by the change of reflectance on the reflective film of the optical recording medium of the present invention as described above, and the optical reproducing apparatus has optical reproducing means which has means for irradiating reproducing beam on the optical recording medium and detection means for detecting the return beam from the reflective film, the micro changes in the detection output of the detection means being reproducing signal of additional recording.

An optical recording reproducing apparatus of the present invention has the optical recording means of the optical recording apparatus and the optical reproducing means of the optical reproducing apparatus described above.

As described above, an optical recording medium of the present invention has an information recording portion on which physical change of shape, for example uneven pits, wobbling grooves or the like for maintaining information. It is possible to form additional recording region on optical recording medium on which reflective film has been mounted, only by selecting the property of the reflective film without increasing the number of film. Therefore, it can be manufactured at low cost and in mass production similar to the conventional CD-ROM or DVD-ROM without the number of production processes.

The additional recording method and reproducing method to the optical recording medium according to the present invention can be performed in a simple way and therefore the optical recording apparatus, optical reproducing apparatus and optical recording reproducing apparatus are composed as a simple structure.

According to the present invention, the additional recording is performed under the condition $0.5\%<(|R_0-R_1|/R_0)\times 100\%<17\%$,—where $R_0$ is reflectance of reproducing beam in respect to the non-recording state, and $R_1$ is reflectance of recording state. In case that the additional recording region is overlapped by the aforementioned information recording portion, $0.5\%<(|R_0-R_1|/R_0)\times 100\%<10\%$. The recording is performed with such a small change of reflectance, the reproducing output can be smaller than the output of reproducing information, for example, data information from the essential recording portion. Accordingly, as can be seen from the description hereinafter, the reproduction or reading of the additional recording information can be performed without disturbing the reproduction of information, for example, date information from the essential recording portion.

The additional recording can be performed by a small range of change in reflectance and therefore S/N is small on the reproduction of the additional recording. However, since the additional recording is used for cipher, mark or the like, it is required that the output is enough to read the recording and high S/N ratio is not required.

As described above, according to the present invention, in case that the additional recording region is not formed in the information recording region of the reflective film, $(|R_0-R_1|/R_0)\times 100\%$ is equal to or less than 17%. The reason of such condition is the following. If the reflectance is varied due to recording, focusing and tracking servo should follow stably to the change of reflectance. Generally, a stable servo can be achieved as much as the change of reflectance is small in additional recording.

For example, in case of ROM disk such as DVD, the reflectance is set to 60%–85%. If the disk has a reflectance in this range, a stable servo can be achieved without adding a high servo circuit. By selecting the mean value of 60%–85%, or 72.5% as the circuit constant of the servo circuit, the maximum variation of the reflectance, if it exits, is $(72.5-60)/72.5\times 100=17\%$. Therefore, a simple circuit can achieve servo. If simple recording is performed partially in the additional recording, 17% of the reflectance of the same level is desirable.

BRIEF DESCRIPTION OF THE DRAWINGS

FIG. 8 is a diagram of an example of an optical reproducing device according to the present invention.

BEST MODE FOR CARRYING OUT THE INVENTION

The present invention can be applied to optical recording medium, for example, CD, DVD, or the like.

The present invention is directed to optical recording medium having an information recording portion or ROM portion on which the essential information of data information or the like is recorded by physical change of shape in at least one direction of depth and track width on substrate of disk, card, or sheet type, and information layer on which reflective film is mounted, wherein the reflective film is applied to form an additional recording region by thermal recording, the reflective film having a reflectance range of: $0.5\% < (|R_0-R_1|/R_0) \times 100\% < 17\%$, and in case that the additional recording region is overlapped with the information recording portion, a reflectance range of $0.5\% < (|R_0-R_1|/R_0) \times 100\% < 10\%$, The reflective film may be formed as a simple layer structure with a metal film or semiconductor film.

An example of an embodiment of an optical recording medium according to the present invention will be described below with reference to the schematic sectional view of FIG. 1.

In this example, a DVD configuration is used. However, the present invention is not limited to the example.

Figure 1:
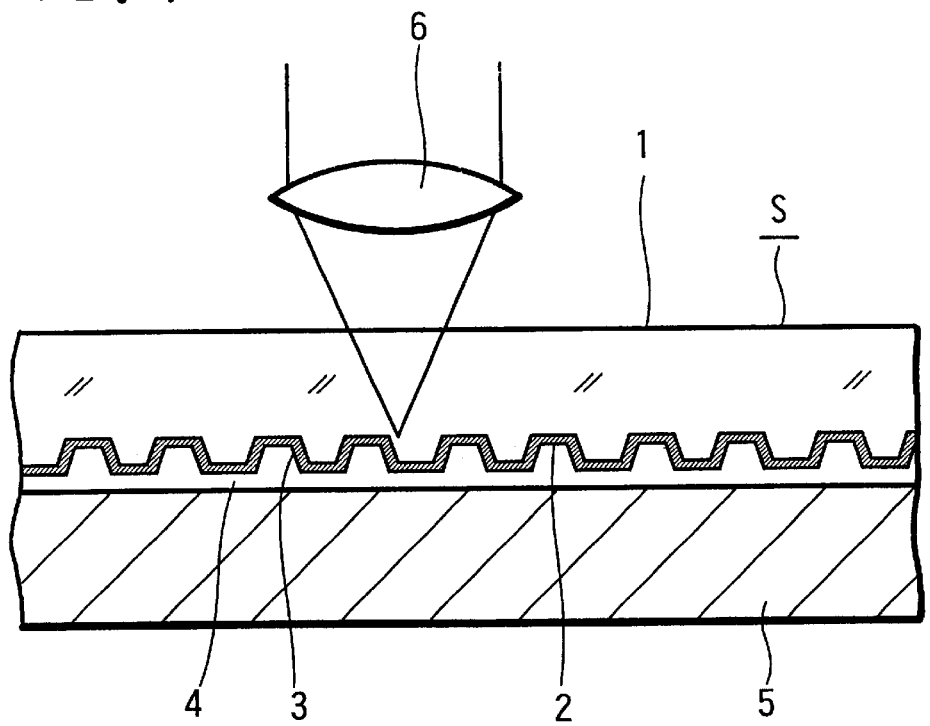
FIG. 1 is a schematic sectional view of a main part of an example of an optical recording medium according to the present invention.

An optical recording medium S according to the present invention shown in FIG. 1 has the following configuration. An information layer 2 on which information recording portion is formed by physical change of shape, or uneven pits, is formed on one major surface of a transparent substrate 1 consisting of, e.g., polycarbonate (PC) by physical change of surface or by making uneven pits, and a reflective film 3 is adhered to the entire surface of the information layer 2, an adhesive agent 4 consisting of, e.g., an ultraviolet setting resin is coated by, e.g., spin coat, on the substrate 1 on the side having the information layer 2. Another substrate 5 is superposed on the transparent substrate 1, the adhesive agent 4 is set by ultraviolet irradiation, so that both the substrates 1 and 5 are joined to each other.

Figure 2:
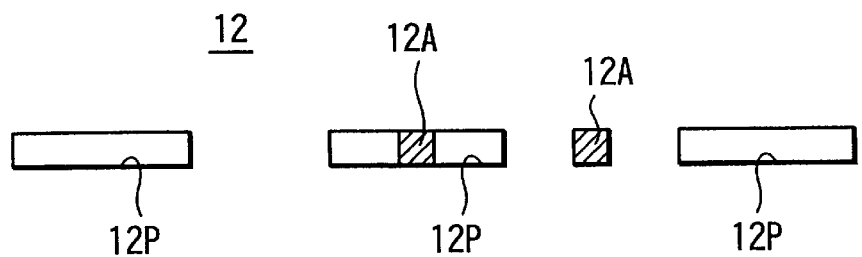
FIG. 2 is a schematic plan view of a main part showing the relationship between a recording portion and an additional recording portion in an example of the optical recording medium according to the present invention.
Figure 3:
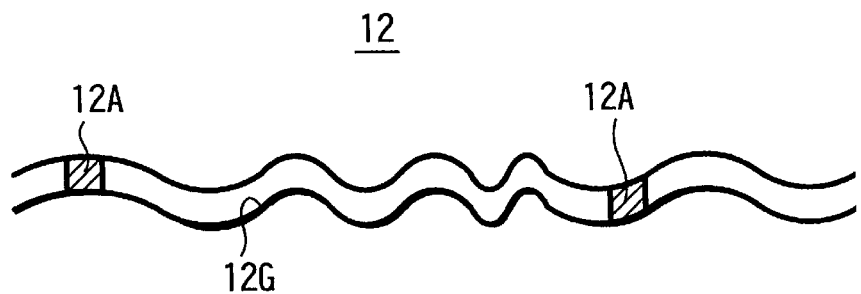
FIG. 3 is a schematic plan view of a main part showing the relationship between a recording portion and an additional recording portion in another example of the optical recording medium according to the present invention.

The thicknesses of both the substrates 1 and 5 are set within, e.g., about 0.6 mm each, and the total thickness of the optical recording medium S is set to be, e.g., 1.2 mm In the information layer 2, for example, parts of which are shown in the schematic plan views of FIG. 2 and FIG. 3, respectively, an essential recording portion 12 in which data information or the like is formed as uneven pits 12P obtained by transformation in a direction of thickness as shown in FIG. 2, or as shown in FIG. 3, an essential recording portion 12 in which the data information or the like is formed as a winding guide groove 12G obtained by transformation in a direction of track width.

These recording portions 12, i.e., the uneven pits 12P, the winding guide groove 12G, or the like are formed on a major surface of the substrate 1 by injection molding using a stamper having corresponding pits or a corresponding groove synchronously with molding of the substrate 1, or can be formed by a normal method using a so-called 2P method such that, e.g., an ultraviolet setting resin is coated on a transparent substrate, and a stamper having desired pits or a desired groove is pressed to set the ultraviolet setting resin.

The reflective film 3 is adhesively formed on the entire surface of the information layer 2. The reflective film 3 causes the information layer 2 to have the function of the reflective film obtained in reading of an essential record such as data information from the recording portion 12. However, at the same time, in the present invention, the reflective film 3 is used as a recording layer for additional recording. More specifically, an additional recording region is also constituted by the reflective film 3.

The additional recording region may be formed in the essential recording portion 12 depending on the purpose of an additional record or may be formed out of the forming region of the essential recording portion 12. However, when the additional recording region is formed in the essential recording portion of information recording portion 12, the additional recording region is formed out of the shortest cycle portion of a change in physical shape of the essential recording portion. More specifically, the essential recording portion 12, as shown in FIG. 2, employs a recording manner obtained by formation of the uneven pits 12P, an additional recording portion 12A is formed in a pit portion consisting of a recessed portion or a projection portion or between the pits except for the shortest uneven pitch portion of the uneven pits 12P. As shown in FIG. 3, when the essential recording portion 12 is constituted by, e.g., the wobbling guide groove 12G, the additional recording portion 12A can be formed in, e.g., the winding guide groove 12G except for the shortest cycle portion of the cycle of a reciprocal change in the direction of track width.

The reflective film 3 is made of a metal film or a semiconductor film, the reflectance of which can be varied in a predetermined range for the aforementioned reading beam due to thermal recording by for example laser irradiation.

An example of reflective film 3 is constituted by an Al alloy film consisting of $Al_{100-x} X_x$, and the X is at least one type of element selected from Ge, Ti, Ni, Si, Tb, Fe, and Ag. In this case, a composition x atomic % of entire X in the Ag alloy film is set within the range of $5<x<50$ atomic %.

Another example of reflective film 3 is made of Al-alloy film of $Al_{100-x-z} X_x Z_z$, the X being at least one element selected from Ge, Ti, Ni, Si, Tb, Fe, and Ag, the Z being at least one element beside the X selected from those elements, the composition rate x of an element or elements X in Al-alloy being selected as $4<x<50$ atomic %, and the composition rate z of an element or elements Z in Al-alloy being selected as $0<z<5$ atomic %.

When the reflective film 3 is constituted by an Ag alloy film consisting of $Ag_{100-x} X_x$, the X is at least one type of element selected from Ge, Ti, Ni, Si, Tb, Fe, and Al. In this case, a composition x of entire X in the Ag-Al alloy film is set within the range of $5<x<50$ atomic %.

Another example of reflective film 3 is made of Ag-alloy film of $Ag_{100-x-z} X_x Z_z$, the X being at least one element selected from Ge, Ti, Ni, Si, Tb, Fe, Cr, Al, and Au, the composition rate x of an element or elements X in Ag-alloy being selected as $5<x<50$ atomic %, the Z being at least one element beside the X selected from those elements, and the composition rate z of an element or elements Z in Ag-alloy being selected as $0<z<5$ atomic %.

Another example of reflective film 3 is made of Cu-alloy film $Cu_{100-x} X_x$, the X being at least one element selected from Al, Ti, Cr, Ni and Fe, and the composition rate x of an element or elements X in Cu-alloy being selected as $5<x<40$ atomic %.

Further another example of reflective film 3 is made of Cu-alloy $Cu_{100-x-z} X_x Z_z$, the X being at least one element selected from Al, Ti, Cr, Ni and Fe, the composition rate x of an element or elements X in Cu-alloy being selected as $5<x<40$ atomic %, the Z being at least one element beside the X selected from those elements, and the composition rate z of an element or elements Z in Cu-alloy being selected as $0<z<5$ atomic %.

In another case, reflective film 3 may be made of Si of semiconductor materials. In the present invention, Si means the one having an purity of Si as much as that of typical semiconductor material and it allows to include other elements as much as semiconductor material.

The reflective film 3 can be formed by, e.g., a sputtering method, e.g., a magnetron sputtering method. In this case, by using a sputtering target consisting of metal or semiconductor each having the required composition or a plurality of sputtering targets consisting of elements and an alloy thereof, exhaustion is performed such that the degree of vacuum in a sputtering device is a desired degree of vacuum or less, and sputtering is performed. However, the film thickness of the reflective film 3 is selected under the control of input power and time of the sputtering.

Figure 4:
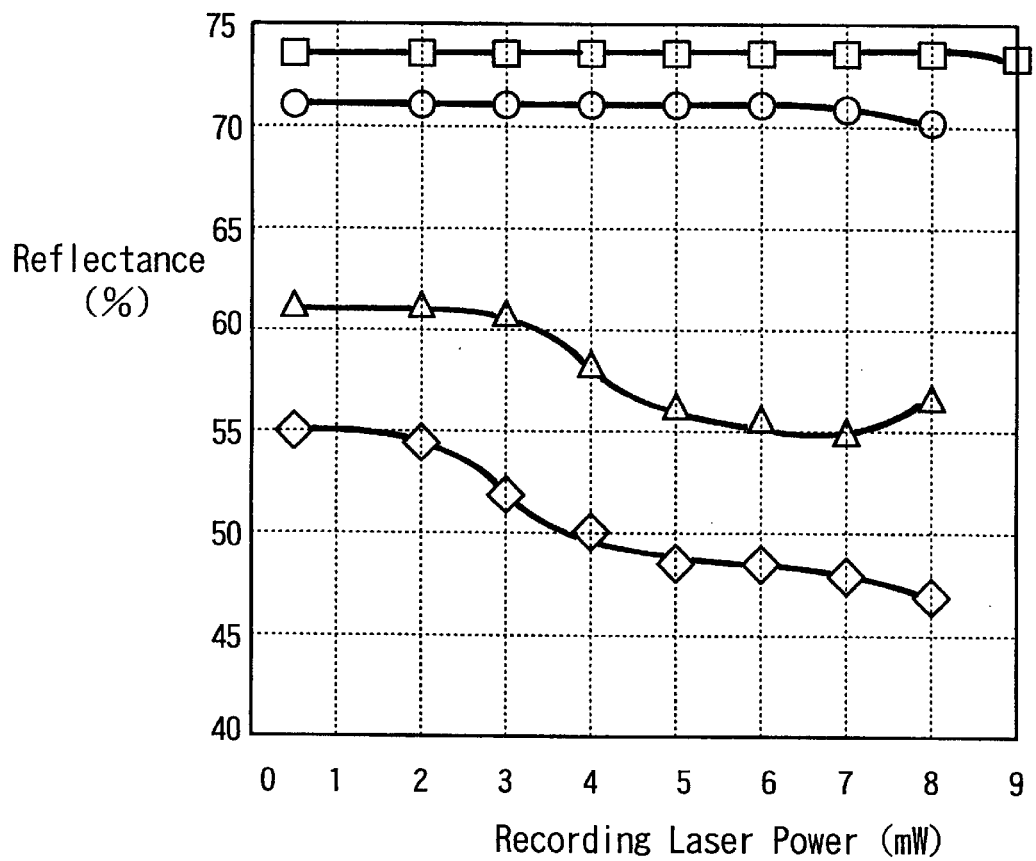
FIG. 4 is a graph showing measurement results of the relationships between recording powers and reflectances in examples in which compositions are different from each other.

FIG. 4 shows results obtained by measuring the relationships between recording laser beam powers [mW] and reflectances [%] in examples in which compositions are different from each other, i.e., examples in which x=11.2 atomic %, x=16.0 atomic %, x=20.0 atomic %, x=27.6 atomic % in $Al_{100-x}Ge_x$. More specifically, in FIG. 4, as mark □ indicates a measurement result obtained when x=11.2 atomic %, a mark ○ indicates a measurement result obtained when x=16.0 atomic %, a mark Δ indicates a measurement result obtained when x=20.0 atomic %, and a mark ◇ indicates a measurement result obtained when x=27.6 atomic %.

In this case, the thickness of the reflective film was set at 50 nm, a light source used in recording and reproducing was a semiconductor laser having a wavelength of 660 nm. As shown in FIG. 1, a laser beam was irradiated from the transparent substrate 1 side through an objective lens 6. The numerical aperture N.A. of the objective lens 6 was 0.60, a linear speed in recording was 1.5 m/sec, and recording was performed by continuous light. In this case, the transparent substrate 1 is constituted by a polycarbonate (PC) substrate in which a guide groove is formed by injection molding.

According to FIG. 4, when the composition of Ge is small, e.g., 11.2 atomic %, although a high reflectance exhibits, a recording power required for recording becomes high. A change in reflectance $R_s((R_s=(1R_u-R_1|)/R_0)\times100\%)$ obtained at a power of 9 [mW] is a fine change of 0.68%. In contrast to this, when the composition of Ge is large, although the reflectance in an unrecorded state decreases, a change in reflectance, i.e., recording is performed by a required recording power.

When the composition of, e.g., Ge is set at 20 atomic %, the reflectance is kept at 61% without a change when the recording power if 2 mW or less. More specifically, recording is not performed. However, when the recording power is 3 mW or more, a change in reflectance occurs. For example, when the recording power is set at 6 to 7 mW, and the reflectance is 55%. More specifically, the reflectance in the unrecorded state and the reflectance in the recorded state are different from each other in the change of reflectance $R_s=9.84\%$, and recording is performed by the change.

In addition, when the composition of Ge is set at 27.6 atomic %, i.e., is close to 30 atomic %, a change in reflection is observed at a recording power of about 2 mW. When the recording power is set at 5 to 8 mW, a change in reflectance of $R_s=14.54\%$ can be obtained.

More specifically, it is understood that a change in reflectance $R_s$ which can be reproduced, i.e., not less than 0.5% can be obtained by selecting the composition of Ge. More specifically, it is understood that recording can be performed to the reflective film.

In this case, although recording is performed by continuous laser light, the same result as described above can be obtained even though pulse laser light is used.

For example, as described above, when recording is performed by using uneven pits 12P as the recording portion 2, in general, the recording information is recorded in the form of an edge position in the direction of running of the pits. The edge position is performed by detecting a zero cross position of a signal after the offset of a reproduction output signal such as asymmetry is corrected. Therefore, additional recording may be performed by using any position in the pit string without influencing the zero cross detection as an additional recording region to form an additional recording portion. More specifically, since a ratio of a signal output in a pit string having the shortest cycle in the pit string to an output obtained from a pit string having the longest cycle is about 0.1 to 0.3, a shift at the edge portion may be generated by a fine change in reflectance. As shown in FIG. 2, the additional recording portion 12A is preferably formed on a portion except for the shortest cycle portion such that the additional recording portion 12A does not influence the edge information of the recording portion 2.

Figure 5:
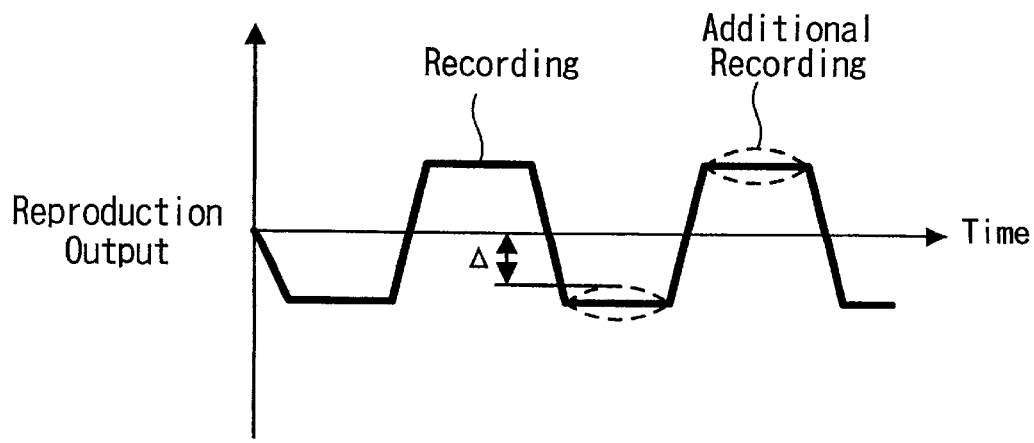
FIG. 5 is a reproduction output waveform chart used in the description of the present invention.

In this manner, as shown in FIG. 5, a fine change occurs on the basis of a change in reflectance of the additional recording portion 2, i.e., an increase or decrease in reflectance as indicated by a broken line with respect to a reproduction output obtained by, e.g., recording pits indicated by a solid line in FIG. 5. Therefore, when the fine change is detected, the small detection output can be used as a reproduction signal of additional recording.

The additional recording signal is actually low in density and low in band, and, furthermore, the same signals are recorded in a plurality of additional recording regions in, e.g., additional recording, e.g., a reproducing method such as reproduction at a plurality of positions which is different from a conventional method is applied, so that the additional record can be stably reproduced when a change in reflectance related to the additional recording is not less than 0.5%.

However, when the change in reflection in the additional recording is excessively large, the difference 66 between the reproduction output and the zero cross level described in FIG. 5 decreases to influence a reproduction output of an essential record. For this reason, the change in reflectance $R_s$ is desirably set at 10% or less.

More specifically, a change in reflection $R_s$ related to the additional recording is desirably set at not less than 0.5% and not more than 10%.

Table 1 and table 2 illustrate reflective film compositions in which a change $R_s$ of ±0.5% with respect to a reflectance before recording and reflectances $R_o$ [%], recording powers [mW], and film thicknesses [nm] obtained in this case before recording.

TABLE 1

| Material Component (at %) | Reflectance before Recording (%) | Recording power (mW) | Film Thickness (nm) |
|---|---|---|---|
| $Al_{88.8}Ge_{11.2}$ | 73.5 | 9.2 | 50 |
| $Al_{84.0}Ge_{16.0}$ | 71.0 | 7.5 | 50 |
| $Al_{80.0}Ge_{20.0}$ | 61.0 | 3.2 | 50 |
| $Al_{72.4}Ge_{27.6}$ | 51.0 | 2.3 | 50 |
| $Al_{61.2}Ge_{38.8}$ | 42.0 | 1.9 | 50 |
| $Al_{53.1}Ge_{46.9}$ | 38.5 | 1.7 | 50 |
| $Al_{92.3}Ti_{7.7}$ | 74.4 | 9.5 | 50 |
| $Al_{89.0}Ti_{11.0}$ | 68.0 | 6.5 | 50 |
| $Al_{85.8}Ti_{14.2}$ ○ | 62.6 | 3.5 | 50 |
| $Al_{77.2}Ti_{22.8}$ | 48.0 | 7.5 | 50 |
| $Al_{69.3}Ti_{30.7}$ | 45.0 | 4.0 | 50 |
| $Al_{79.5}Ni_{20.5}$ | 50.7 | 3.5 | 50 |
| $Al_{65.9}Ni_{34.1}$ | 33.5 | 3.5 | 50 |
| $Al_{56.3}Ni_{43.7}$ ○ | 41.3 | 3.0 | 50 |
| $Al_{88.5}Si_{11.5}$ | 64.0 | 7.0 | 50 |
| $Al_{82.8}Si_{17.2}$ | 60.0 | 2.8 | 50 |
| $Al_{76.3}Si_{23.7}$ | 61.6 | 2.4 | 50 |
| $Al_{70.7}Si_{29.3}$ | 61.8 | 2.4 | 50 |

TABLE 1-continued

| Material Component (at %) | Reflectance before Recording (%) | Recording power (mW) | Film Thickness (nm) |
|---|---|---|---|
| $Al_{92.0}Tb_{8.0}$ ○ | 63.0 | 4.0 | 38 |
| $Al_{88.0}Tb_{12.0}$ ○ | 57.5 | 3.6 | 38 |
| $Al_{88.0}Fe_{12.0}$ ○ | 64.0 | 5.5 | 38 |
| $Al_{85.7}Ag_{14.3}$ | 74.5 | 9.2 | 40 |
| $Al_{81.3}Ag_{18.7}$ | 72.4 | 8.0 | 40 |
| $Al_{77.0}Ag_{23.0}$ | 71.9 | 8.0 | 40 |
| $Ag_{70.9}Al_{29.7}$ | 66.4 | 7.0 | 40 |
| $Ag_{87.4}Al_{12.6}$ | 65.3 | 9.0 | 40 |
| $Ag_{79.4}Ge_{20.8}$ | 65.3 | 5.4 | 40 |
| $Ag_{72.0}Ge_{28.0}$ | 55.6 | 3.7 | 40 |
| $Ag_{65.8}Ge_{34.2}$ | 50.9 | 3.5 | 40 |
| $Ag_{89.0}Ti_{11.0}$ | 70.0 | 9.5 | 40 |
| $Ag_{82.6}Ti_{17.4}$ | 66.3 | 7.0 | 40 |

TABLE 2

| Material Component (at %) | Reflectance before Recording (%) | Recording power (mW) | Film Thickness (nm) |
|---|---|---|---|
| $Al_{80.0}Cu_{20.0}$ | 71.5 | 9.4 | 50 |
| $Al_{73.7}Cu_{26.3}$ | 64.3 | 8.0 | 50 |
| $Al_{68.6}Cu_{31.4}$ | 58.5 | 7.4 | 50 |
| $Al_{66.8}Cu_{30.0}Ti_{3.2}$ | 63.2 | 7.0 | 50 |
| $Al_{65.2}Cu_{29.0}Ti_{5.8}$ | 60.8 | 6.5 | 50 |
| $Al_{66.8}Cu_{30.3}Cr_{2.9}$ | 62.5 | 7.1 | 50 |
| $Al_{65.5}Cu_{28.0}Cr_{6.5}$ | 58.9 | 6.0 | 50 |
| $Cu_{90.6}Al_{9.4}$ | 68.9 | 9.8 | 50 |
| $Cu_{87.6}Al_{12.4}$ | 67.0 | 9.0 | 50 |
| $Cu_{82.5}Al_{17.5}$ | 68.5 | 8.0 | 50 |
| $Cu_{82.7}Al_{6.8}Ti_{10.5}$ | 68.2 | 6.5 | 50 |
| $Cu_{80.4}Al_{6.6}Ti_{13.0}$ | 65.2 | 5.2 | 50 |
| $Cu_{82.3}Al_{12.4}Ti_{5.3}$ | 66.0 | 7.0 | 50 |
| $Cu_{77.8}Al_{14.2}Ti_{8.0}$ | 64.5 | 6.1 | 50 |
| $Cu_{76.0}Al_{19.5}Ti_{4.5}$ | 66.8 | 6.6 | 50 |
| $Al_{70.3}Al_{25.4}Ti_{4.3}$ | 68.3 | 5.0 | 50 |
| $Al_{95.5}Ti_{4.5}$ | 77.5 | 0.3 | 50 |
| $Al_{95.2}Ti_{3.8}Ni_{1.0}$ | 77.2 | 9.8 | 50 |
| Si ○ | 23.1 | 3.6 | 15 |
| Si ○ | 26.5 | 3.5 | 18 |
| $Ag_{95.5}Ti_{4.5}$ ○ | 31.5 | 6.7 | 13 |
| $Ag_{95.1}Pd_{0.9}Ti_{4.0}$ ○ | 31.0 | 6.8 | 13 |
| $Ag_{92.6}Pd_{0.9}Ti_{6.5}$ ○ | 30.6 | 5.9 | 13 |
| $Ag_{95.5}Cr_{4.5}$ ○ | 31.4 | 6.5 | 13 |
| $Ag_{94.6}Pd_{0.9}Cr_{4.5}$ ○ | 31.2 | 6.1 | 13 |
| $Ag_{84.6}Au_{10.9}Ti_{4.5}$ ○ | 30.2 | 6.0 | 13 |
| $Ag_{95.0}Si_{5.0}$ | 30.7 | 7.5 | 13 |
| $Au_{95.2}Ti_{4.8}$ | 29.5 | 5.4 | 15 |
| $Au_{93.7}Ti_{6.3}$ | 28.3 | 5.0 | 15 |

In Tables 1 and 2, material added with mark ○ is material reflectance of which increases.

As is apparent from Tables 1 and 2, changes in reflectance are observed with respect to additional elements of a large number of types. In most of metal films consisting of Al, Ag, and the like and formed by, e.g., a sputtering method, atoms obtained by a thermal process (thermal recording) after film formation move to change a film structure and crystallinity, so that a change in reflectance may occur.

Therefore, in most of the metal thin films, the reflectances may change to some extent. Actually, with respect to a metal having a high heat conductivity of single metals such as Al, Ag, Au, and Cu or a material such as W, Mo, Ta, or Pt which has an extremely high melting point and a high temperature at which atoms move, a recording temperature at which a change in reflectance $R_s$ of not less than 0.5% is obtained cannot be easily obtained by a recording power using a semiconductor laser.

When an excessively high recording temperature is required, the recording temperature damages the surface of the plastic substrate itself of the transparent substrate 1, and information reproduction by the pits may be influenced.

In contrast to this, as described above, in a material itself such as Al or Ag having a high heat conductivity, another element, i.e., as described above, Al is used as a base material. A reflective film consisting of an alloy of two or more elements which is obtained by adding one or more type of element selected from Ge, Ti, Ni, Si, Tb, Fe, and Ag of 4 to 50 atomic % to the base material or an alloy of two or more elements which is obtained by adding one or more type of element selected from Ge, Ti, Ni, Si, Tb, Fe, Cr, Al and Au to Ag serving as a base material, so that recording which can obtain a change in reflectance of not less than 0.5% at a power in a semiconductor laser, i.e. 50 mW or less, futhermore, 30 mW or less.

In the reflectance film 3 described above, by an Al alloy film consisting of $Al_{100-x-z}X_xZ_z$ or an Ag alloy film consisting of $Ag_{100-x-z}X_xZ_z$, i.e., in the Al alloy film or the Ag alloy film, as still another element, Z, e.g., one or more type of element selected from B, C, N, O, Mg, V, Cr, Mn, Co, Cu, Zn, Ga, As, Se, Y, Zr, Nb, Mo, Pd, In, Sn, Sb, Te, Lu, Hf, Ta, W, Ir, Pt, Au, Pb, Bi, La, Ce, Nd, Sm, Gd, Dy, Ho, and Er is added, so that a required change in reflectance can be obtained by, e.g., a semiconductor laser. The added quantity of the element Z is small, i.e., the composition z can be set within $0 \leq z \leq 5$ atomic %.

Thereby such a recording can be achieved that a change in reflectance $R_s$ of more than 0.5% can be obtained at a power in semiconductor laser or less than 50 mW or 30 mW.

Further, in case of the reflective film 3 having Cu of Cu 100-xXx as a mother material, by adding at least on element selected from Al, Ti, Cr, Ni, and Fe and selecting 5<x<40 atomic % as composition rate x of an element or elements X in Cu alloy, similarly, such a recording can be achieved that a change in reflectance $R_s$ of more than 0.5% can be obtained at a power in semiconductor laser of less than 50 [mW], 30 mW. Furthermore, in case of the reflective film 3 having Cu of Cu $100_{x-z}X_xZ_z$ as a mother material, by adding at least one element selected from Al, Ti, Cr, Ni, and Fe and at least one element selected from B, C, N, O, Mg, V, Cr, Mn, Co, Cu, Zn, Ga, As, Se, Y, Zr, Nb, Mo, Pd, In, Sn, Sb, Te, Lu, Hf, Ta, W, Ir, Pt, Au, Pb, Bi, La, Ce, Nd, Sm, Gd, Dy, Ho and Er and by selecting 0?<x?<5 atomic % as the composition rate z of an element or elements Z in Cu alloy, similarly, such a recording can be achieved that a change in reflectance $R_s$ of more than 0.5% can be obtained at a power in semiconductor laser of less than 50 mW, or 30 mW.

In the embodiment of FIG. 1 described above, a DVD configuration having the single information layer 2 is used. However, as shown in the schematic sectional view in FIG. 6, an optical recording medium configuration such as a DVD having, e.g., a two-layer information layer obtained such that a second substrate 31 having a second information layer 32 on which a second reflective film 33 is formed is superposed on the information layer 2 to be joined to the information layer 2 by a transparent adhesive agent 4 may be used.

In this case, from the substrate 1 side to the second information layer 32, a configuration which performs additional recording, additional recording in the second information layer, reading of an essential record can also be used. In this case, a reflectance of the first information layer 2 may be set at, e.g., about 10 to 40%. In order to the reflectance, the film thickness of the first reflective film 3 is set at about 5 nm to 20 nm.

In this case, the first reflective film 3 may be made of for example Si-semiconductor film. Such Si-semiconductor may include other elements as impurities as described above.

The first reflective film 3 may be made of Ag-alloy film of $Ag_{100-x}X_x$, the X being at least one element selected from Ge, Ni, Si, Tb, Fe, Al, Ti, Pd, Cr and Au, and the composition rate x of an element or elements X in Ag-alloy film being selected to 4.5<x<40 atomic %.

The first reflective film 3 may be made of Ag-alloy film of $Ag_{100-x-z}X_xZ_z$, the X being at least one element selected from Ge, Ni, Si, Tb, Fe, Al, Ti, Pd, Cr and Au, the Z being at least one element besides the X selected from those elements and the composition rate z of an element or elements Z in Ag-alloy film being selected to 4.5<x<40 atomic %.

The first reflective film 3 may be made of Au-alloy of $Au_{100-x}X_x$, the X being at least one element selected from Ti, Ge, Ni, Tb, Fe, Al, Pd, and Cr, and the composition rate x of an element or elements X in Au-alloy film being selected to 4.5<x<40 atomic %.

These examples of first reflective film 3 can achieve such a recording that $R_s$ is more than 0.5% by semiconductor laser irradiation.

Figure 7:
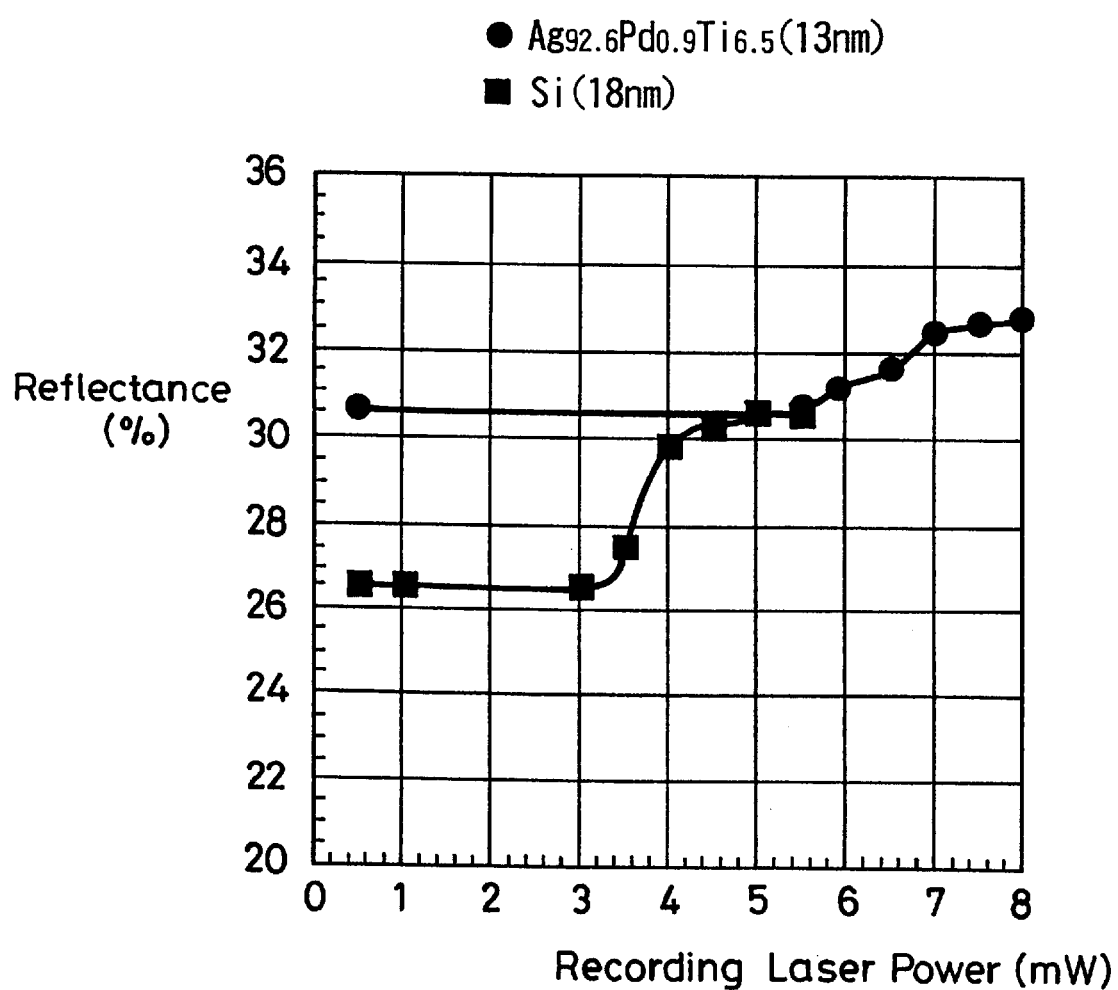
FIG. 7 is a graph showing measurement results of the relationships between recording powers and reflectances in examples in which compositions are different from each other.

FIG. 7 is a graph showing measurement results of the relationships between recording laser power [mW] and reflectance [%], in which ■ shows the measurement result of Si-film having a thickness of 18 nm and • shows the measurement results of A192.6 Pd0.9Ti6.5-film.

As can be seen from FIG. 7, in the case of Si-film having a thickness of 18 nm, if the recording laser power is equal to or less than a level of 3 mW, the reflectance is about 26.5%. However, if it is 5 mW, the reflectance increases to 30.5% and therefore, $R_s$ is about 15%. In the case of A192.6 Pd0.9 Ti6.5-film having a thickness of 13 nm, if the recording laser power is equal to or less than 5 mW, the reflectance is 30.5%. However, if it is 7 mW, the reflectance increases to 32.5% and therefore, $R_s$ is about 6%.

Figure 6:
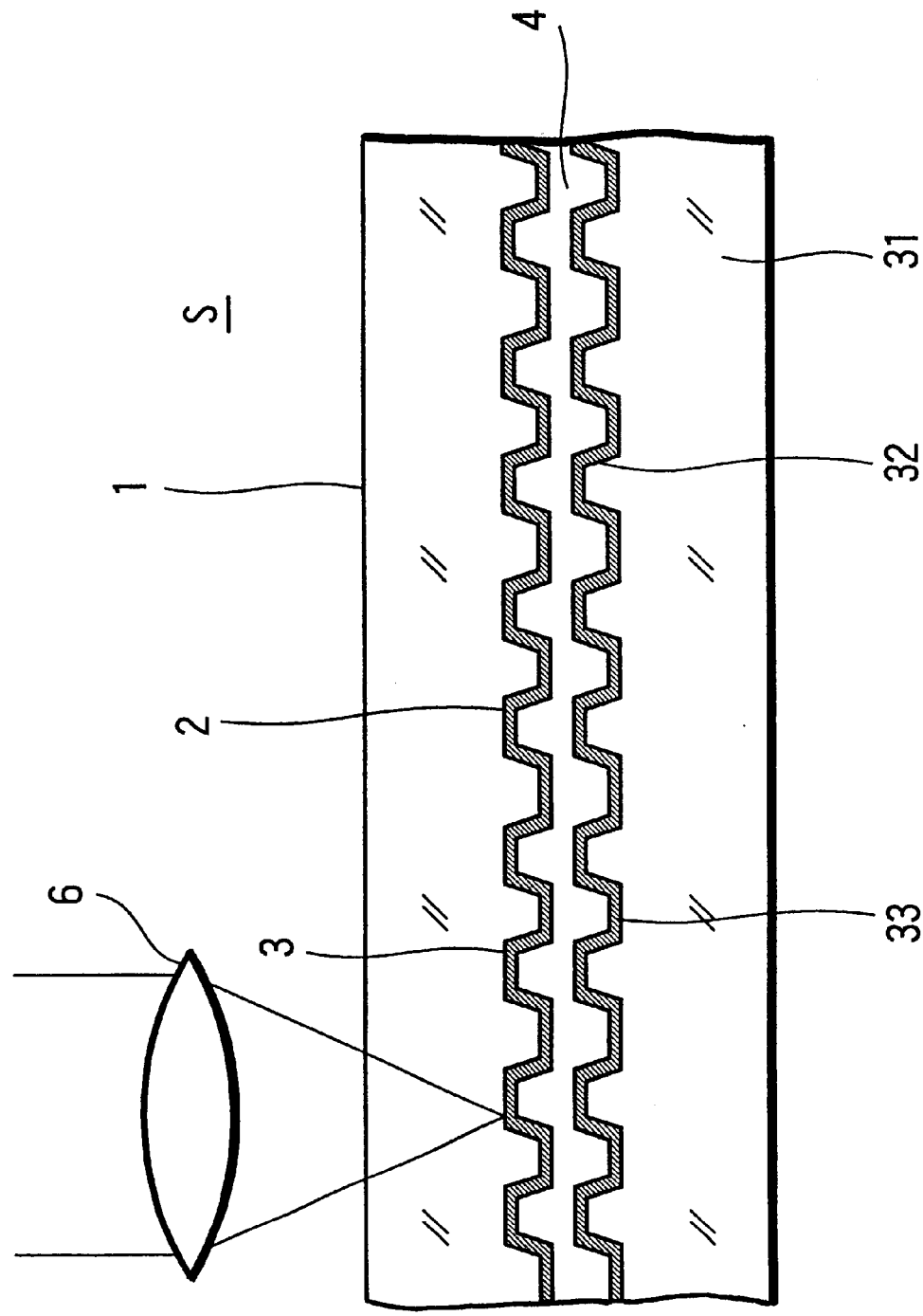
FIG. 6 is a schematic sectional view of a main part of another example of the optical recording medium according to the present invention.

The thickness of the reflective film 3 in the single information layer structure described in FIG. 1 and the thickness of the second reflective film 33 in the two-layer information layer structure in FIG. 6 are desirably set at 20 nm to 70 nm.

As described above, according to the optical recording medium S of the present invention, additional recording can be performed, so that cipher data is described in manufacturing. On the other hand, when the cipher is reproduced by a reproducing device having an algorithm which can decode the cipher, it can be made impossible to reproduce an optical recording medium which is illegally copied, and the optical recording medium S can be used for many applications.

In addition, for example, a rental additionally records a dedicated cipher for a specific person who is permitted to rent a media so as to prevent a person except for the specific person from using the media. For example, the rental can employ various application manners such that a medium management, records of a game end point in game software, the mark of a reproduced position, and user information, a record of a reproduction current, and a function of reading these records are added to a recording/reproducing device by, e.g., a general user.

An optical recording device according to the present invention comprises an optical recording means for the optical recording medium according to the present invention described above. The optical recording medium has an irradiation means of a laser beam modulated depending on additional recording information for the optical recording medium. The optical can perform additional recording by thermal recording in which the reflective film 3 is transformed by irradiation of the laser beam to change the reflectance of the reflective film.

An optical reproducing device according to the present invention comprises an optical reproducing means for an optical recording medium on which the additional recording according to the present invention described above. The optical reproducing means has a reproduction light irradiation means for irradiating reproduction light on the optical recording medium and detection means for detecting return light from the reflective film. The fine change of a detection output from the detection means is used as a reproduction signal of the additional recording.

An optical recording/reproducing device according to the present invention comprises an optical recording means for the optical recording medium according to the present invention described above and an optical reproducing means. The optical recording/reproducing means has an irradiation means for a laser beam modulated depending on additional recording information for the optical recording means. Additional recording is performed by thermal recording in which the reflective film is transformed by irradiation of the laser beam to change the reflectance of the reflective film. The optical reproducing means has a reproduction light irradiation means for irradiating reproduction light on the optical recording medium and detection means for detecting return light from the reflective film, and the fine change of a detection output from the detection means is extracted as a reproduction signal of the additional recording.

An example of an optical recording/reproducing device according to the present invention which performs required additional recording and reproduction thereof by using an optical recording medium S according to the present invention will be described below with reference to the diagram of FIG. 7.

The optical recording/reproducing device performs recording/reproducing for the optical recording medium S constituted by a DVD described in FIG. 1. In this case, the operation recording/reproducing device has a drive unit 41 for rotationally driving the optical recording medium S.

The rotational drive of the drive unit 41 is performed by a spindle motor 42. The spindle motor 42 is controlled by a servo circuit (not shown) to control the rotating speed of the optical recording medium S.

Opposite to the optical recording medium S, an optical pickup 43 constituted by an optical recording means for performing the additional recording described above and serving as an optical reproducing means for reproducing an additional record on the optical recording medium S.

The optical pickup 43 is designed to be moved by a thread mechanism (not shown) in a direction parallel to the radial direction of the optical recording medium S.

This optical pickup 43 comprises an optical irradiation means having a semiconductor laser as in an optical pickup configuration in a conventional optical recording/reproducing device. A laser beam from the semiconductor laser is designed to be convergently irradiated on the optical recording medium S by an objective lens.

The optical irradiation means comprises a modulation means for modulating the quantity of irradiated light of the laser beam for the optical recording medium depending on additional recording information, e.g., a light intensity modulation element arranged on the optical path of the laser beam, or a modulation means (not shown) for controlling the power of the semiconductor laser, so that a recording laser beam for the optical recording medium can be irradiated.

At the same time, in reproduction, a laser beam is irradiated as reduction light.

The optical pickup 43 has a detection unit for detecting return light of the laser beam from the optical recording medium S to extract the return light as an electric output.

In this manner, the additional information record of the additional recording portion 12A and additional records from the recording pits 12P and the additional recording portion 12A are read.

As in a conventional optical pickup, a tracking error signal and a focusing error signal are obtained in the optical pickup 43. By these error signals, tracking servo and focusing servo are performed.

A circuit unit 44 for controlling an optical recording operation and an optical reproducing operation of the optical pickup 43 is arranged. The circuit unit 44 is constituted by, e.g., a CPU (Central Processing Unit) 45, a control unit 46 of the optical pickup 43, a binarizing circuit 47, a decode circuit 48, an ECC (Error Correcting Code) circuit 49, a digital-analog conversion circuit (D-A) 50, and a mark detection circuit 51.

First, a reproducing function in this configuration will be described.

The optical recording medium S has an additional recording portion 12A in which various ciphers and a mark, e.g., a mark for detecting illegal use are recorded in, e.g., a predetermined portion by a manufacturer.

When the optical recording medium S is arranged in the drive unit 41, a required signal is given to the control unit 46 of the optical pickup 43 by a control signal from the CPU 45, and a laser beam from the optical pickup 43 is irradiated on a position where the additional recording position of the optical recording medium S is irradiated, i.e., a predetermined position in which a mark is described. The laser beam is set to be a laser output applied to the mark detection.

In this manner, a reproduction output obtained by the mark of the additional recording portion is extracted from the optical pickup 43, the reproduction output is input to the mark detection circuit 51, and the mark detection output is input to the CPU 45. In this manner, for example, the optical pickup control unit is controlled to stop, e.g., a reproducing operation.

When this stop is not performed, a laser beam of the optical pickup 43 is irradiated on a predetermined essential recording portion 12 of the optical recording medium S by a control signal from the optical pickup control unit 46 in response to a command from the CPU 45 to perform a reproducing operation. More specifically, for example, a read signal of the recording portion 12 from the optical pickup 43 is input to the optical pickup 43. In this manner, the signal is binarized by a predetermined slice level to obtain a binary signal, and the binary signal is decoded by the decode circuit 48 to generate reproduction data.

The reproduction data is input to the ECC circuit 49, and is subjected to an error correction process by using an error correction code added during coding in a recording state, and the reproduction data is converted into an analog signal by the digital-analog conversion circuit 50.

Additional recording for the optical recording medium S is performed by the following manner. That is, as described above, an irradiation position of a laser beam is set to be a predetermined position where the additional recording is performed, recording information such as recording information from the CPU 45 or recording information of another recording information signal source (not shown) is input to the control unit 46, and a laser beam of the optical pickup 43 is modulated by a control signal from the control unit 46.

In the above example, an example of the optical recording/reproducing device according to the present invention having the reproducing function and the recording function for the optical recording medium S is described. However, the optical recording device according to the present invention or the optical reproducing device according to the present invention is constituted as a device having any one of the optical recording function and the optical reproducing function of the configuration described above.

The optical recording medium, the optical recording/reproducing device, the optical recording device, and the optical reproducing device according to the present invention are not limited to devices applied to the so-called DVD. For example, the medium and the devices can be applied to an optical disk such as a CD having a ROM portion and an optical recording medium having another shape.

The optical recording medium according to the present invention described above, in a ROM type optical recording medium, can record an arbitrary record such as a reproduced position, the mark of a game end point in game software, the record of personal information on a user side, the password of a specific renter by a rental, and a reproduction count by making it possible to perform additional recording on, e.g., the user side.

On a manufacturer side, a management code is described to make it possible to specify a manufacturer, decide whether an optical recording medium is illegally copied or not, and perform management or the like.

For example, as described above, by describing cipher data in a manufacturing state, reproduction is performed by a reproducing device having an algorithm which can decode the cipher, so that an illegally copied optical recording medium can be prevented from being reproduced. Therefore, many applications can be achieved.

An optical recording medium according to the present invention, a recording layer having a special configuration is not formed as a recording layer for performing the above additional recording. By setting the composition of a reflective film formed in an essential information layer, the reflective film itself also constitutes an additional recording region for performing the additional recording. For this reason, optical recording media according to the present invention can be manufactured in mass production without increasing the number of manufacturing steps and without using toxic materials. For this reason, the optical recording media can be inexpensively manufactured with mass-productivity and cost which are equal to those of a conventional ROM type optical recording media.

A recording method for an optical recording medium according to the present invention can perform optical recording by using a semiconductor laser. For this reason, a configuration depending on the object of the additional recording is used in a recording device using the recording method, i.e., an optical recording device. However, the optical recording device does not requires a special configuration.

In addition, an optical reproducing method for an optical recording medium according to the present invention can also perform optical reproduction by using a semiconductor laser. For this reason, the optical reproducing method has a configuration depending on the object of additional recording. However, since reading can be basically performed by the semiconductor layer as in a conventional optical recording/reproducing device, a simple configuration can be achieved.

What is claimed is:

1. An optical recording medium having an information layer with a reflective film on which an information recording portion is formed by physical change of shape at least in one direction of depth and track width, wherein, said reflective film having such a structure that additional recording can be performed by thermal recording, and that the reflectance of said reflective film changes in the range of $0.5\% < (|R_0 - R_1|/R_0) \times 100\% < 17\%$, where $R_0$ is reflectance of non-recording state and $R_1$ is reflectance of recording state for reproducing beam.

2. The optical recording medium of claim 1, characterized in that, if the additional recording region of said reflective film is at least partially overlapped with said information recording portion formed by physical change of shape, the reflectance of said reflective film changes in the range of $0.5\% < (|R_0 - R_1|/R_0) \times 100\% < 10\%$.

3. The optical recording medium of claim 1, characterized in that said additional recording region is positioned in or out of recording region having said information recording portion on which said physical change of shape has been performed.

4. The optical recording medium of claim 1, characterized in that if said additional recording region is positioned in recording region having said information recording portion by physical change of shape, said additional recording region is positioned in a region other than the shortest period portion of said information recording portion.

5. The optical recording medium of claim 1, characterized in that said reflective film is made of a single layer structure consisting of metal film or semiconductor film.

6. The optical recording medium of claim 1, characterized in that said reflective film is made of Al-alloy film of $Al_{100-X}X_x$, the X being at least one element selected from Ge, Ti, Ni, Si, Tb, Fe, and Ag, and the composition rate x of an element or elements X in Al-alloy being selected as $4 < x < 50$ atomic %.

7. The optical recording medium of claim 1, characterized in that said reflective film is made of Al-alloy film of $Al_{100-X-Z}X_xZ_z$, the X being at least one element selected from Ge, Ti, Ni, Si, Tb, Fe, and Ag, the Z being at least one element beside the X selected from those elements, the composition rate x of an element or elements X in Al-alloy being selected as $4 < x < 50$ atomic %, and the composition rate z of an element or elements Z in Al-alloy being selected as $0 < z < 5$ atomic %.

8. The optical recording medium of claim 1, characterized in that said first reflective film is made of Ag-alloy of $Ag_{100-x}X_x$, the X being at least one element selected from Ge, Ti, Ni, Si, Tb, Fe, Al, Cr, and Au, and the composition rate x of an element or elements X in Ag-alloy film being selected as $5 < x < 50$ atomic %.

9. The optical recording medium of claim 1, characterized in that said first reflective film is made of Ag-alloy of $Ag_{100-x-z}X_xZ_z$, the X being at least one element selected from Ge, Ti, Ni, Si, Tb, Fe, Al, Cr, and Au, the composition rate x of an element or elements X in Ag-alloy film being selected to $5 < x < 50$ atomic %, the Z being at least one element besides the X selected from those elements and the composition rate z of an element or elements Z in Ag-alloy film being selected to $0 < x < 50$ atomic %.

10. The optical recording medium of claim 1, characterized in that said reflective film is made of Cu-alloy film of $Cu_{100-X}X_x$, the X being at least one element selected from Al, Ti, Cr, Ni and Fe, and the composition rate x of an element or elements X in Cu-alloy being selected as $5 < x < 40$ atomic %.

11. The optical recording medium of claim 1, characterized in that said reflective film is made of Cu-alloy film of $Cu_{100-X-Z}X_xZ_z$, the X being at least one element selected from Al, Ti, Cr, Ni and Fe, the composition rate x of an element or elements X in Cu-alloy being selected as $5 < x < 40$ atomic %, the Z being at least one element beside the X selected from those elements, and the composition rate z of an element or elements Z in Cu-alloy being selected as $0 < z < 5$ atomic %.

12. The optical recording medium of claim 1, characterized in that said reflective film is made of claim of Si.

13. The optical recording medium of claim 1, characterized in that said information layer has first information layer and second information layer which are laminated to each other, and reproducing beam is irradiated from said first or second information layer to said first and second information layers, the first or second reflective film of said first or second information layer of the incident side of said reproducing beam being made of Si.

14. The optical recording medium of claim 1, characterized in that said information layer has first information layer and second information layer which are laminated to each other, and reproducing beam is irradiated from said first or second information layer to said first and second information layers, the first or second reflective film of said first or second information layer of the incident side of said reproducing beam being made of Ag-alloy of $Ag_{100-x}X_x$, the X being at least one element selected from Ge, Ni, Si, Tb, Fe, Al, Ti, Pd, Cr and Au, and the composition rate x of an element or elements X in Ag-alloy film being selected to $4.5 < x < 40$ atomic %.

15. The optical recording medium of claim 1, characterized in that said information layer has first information layer and second information layer which are laminated to each other, and reproducing beam is irradiated from said first or second information layer to said first and second information layers, the first or second reflective film of said first or second information layer of the incident side of said reproducing beam being made of Ag-alloy of $Ag_{100-x-z}X_xZ_z$, the X being at least one element selected from Ge, Ni, Si, Tb, Fe, Al, Ti, Cr and Au, the composition rate x of an element or elements X in Ag-alloy film being selected to $5 < x < 50$ atomic %, the Z being at least one element besides the X selected from those elements and the composition rate z of an element or elements Z in Ag-alloy film being selected to $0 < x < 5$ atomic %.

16. The optical recording medium of claim 1, characterized in that said information layer has first information layer and second information layer which are laminated to each other, and reproducing beam is irradiated from said first or second information layer to said first and second information layers, the first or second reflective film being made of Au-alloy of $Au_{100-x}X_x$, the X being at least one element selected from Ti, Ge, Ni, Tb, Fe, Al, Pd, and Cr and the composition rate x of an element or elements X in Au-alloy film being selected to $4.5 < x < 40$ atomic %.

17. An optical recording method for performing additional recording by thermal recording such that the reflectance is changed due to the change of property of reflective film by irradiating laser beam modulated by additional recording information signal on optical medium, said optical medium having an information layer with a reflective film on which an information recording portion is formed by physical change of shape at least in one direction of thickness and track width, said reflective film having such a structure that additional recording can be performed by thermal recording, and that the reflectance of said reflective film changes in the range of $0.5\% < (|R_0 - R_1|/R_0) \times 100\% < 17\%$, where $R_0$ is reflectance of non-recording state and $R_1$ is reflectance of recording state for reproducing beam.

18. An optical reproducing method for performing reproduction of additional recording such that fine change of return beam is performed due to the change of reflectance by irradiating laser beam on optical medium, said optical medium having an information layer with a reflective film on which an information recording portion is formed by physical change of shape at least in one direction of thickness and track width, wherein, said reflective film having such a structure that additional recording can be performed by thermal recording, and that the reflectance of said reflective film changes in the range of $0.5\% < (|R_0 - R_1|/R_0) \times 100\% < 17\%$, where $R_0$ is reflectance of non-recording state and $R_1$ is reflectance of recording state for reproducing beam.

19. An optical recording apparatus comprising optical recording means for optical medium, said optical medium having an information layer with a reflective film on which an information recording portion is formed by physical change of shape at least in one direction of thickness and track width, said reflective film having such a structure that additional recording can be performed by thermal recording, and that the reflectance of said reflective film changes in the range of $0.5\% < (|R_0 - R_1|/R_0) \times 100\% < 17\%$, where $R_0$ is reflectance of non-recording state and $R_1$ is reflectance of recording state for reproducing beam, wherein, said optical recording means has irradiation means for irradiating on optical medium laser beam which can be modulated in response to additional recording information to perform additional recording by thermal recording such that the reflectance is changed due to the change of property of reflective film by the irradiation of laser beam.

20. An optical reproducing apparatus comprising optical reproducing means for optical medium, said optical medium having an information layer with a reflective film on which an information recording portion is formed by physical change of shape at least in one direction of thickness and track width, said reflective film having such a structure that additional recording can be performed by thermal recording, and that the reflectance of said reflective film changes in the range of $0.5\% < (|R_0 - R_1|/R_0) \times 100\% < 17\%$, where $R_0$ is reflectance of non-recording state and $R_1$ is reflectance of recording state for reproducing beam, wherein, said optical reproducing means has irradiation means for irradiating reproducing beam on optical medium and detecting means for detecting return beam from said reflective film, fine change of detecting output from said detecting means being reproduction signal of said additional recording.

21. An optical recording and reproducing apparatus comprising optical recording means and optical reproducing means for optical medium, said optical medium having an information layer with a reflective film on which an information recording portion is formed by physical change of shape at least in one direction of thickness and track width, said reflective film having such a structure that additional recording can be performed by thermal recording, and that the reflectance of said reflective film changes in the range of $0.5\% < (|R_0 - R_1|/R_0) \times 100\% < 17\%$, where $R_0$ is reflectance of non-recording state and $R_1$ is reflectance of recording state for reproducing beam wherein, said optical recording means has irradiation means for irradiating reproducing beam on optical medium and detecting means for detecting return beam from said reflective film, fine change of detecting output from said detecting means being reproduction signal of said additional recording, said optical reproducing means has irradiation means for irradiating reproducing mean on optical medium and detecting means for detecting return beam from said reflective film, fine change of detecting output from said detecting means being reproduction signal of said additional recording.

* * * * *